United States Patent
Trobaugh et al.

(10) Patent No.: US 7,242,793 B2
(45) Date of Patent: Jul. 10, 2007

(54) PHYSICALLY-BASED, PROBABILISTIC MODEL FOR ULTRASONIC IMAGES INCORPORATING SHAPE, MICROSTRUCTURE AND SYSTEM CHARACTERISTICS

(75) Inventors: Jason W. Trobaugh, St. Louis, MO (US); R. Martin Arthur, Manchester, MO (US)

(73) Assignee: Washington University, St. Louis, MO (US)

( * ) Notice: Subject to any disclaimer, the term of this patent is extended or adjusted under 35 U.S.C. 154(b) by 442 days.

(21) Appl. No.: 09/840,629

(22) Filed: Apr. 23, 2001

(65) Prior Publication Data

US 2002/0075383 A1 Jun. 20, 2002

Related U.S. Application Data

(60) Provisional application No. 60/199,418, filed on Apr. 24, 2000.

(51) Int. Cl.
  *G06K 9/00* (2006.01)
(52) U.S. Cl. ................ 382/128; 382/154; 600/443
(58) Field of Classification Search .............. 382/128, 382/131, 154; 600/443
  See application file for complete search history.

(56) References Cited

U.S. PATENT DOCUMENTS

| | | | | |
|---|---|---|---|---|
| 5,031,154 A | * | 7/1991 | Watanabe | 367/8 |
| 5,339,815 A | * | 8/1994 | Liu et al. | 600/437 |
| 5,737,456 A | | 4/1998 | Carrington et al. | 382/299 |
| 5,841,889 A | * | 11/1998 | Seyed-Bolorforosh | 382/128 |
| 5,912,993 A | | 6/1999 | Puetter et al. | 382/275 |
| 6,050,943 A | * | 4/2000 | Slayton et al. | 600/439 |
| 6,106,466 A | * | 8/2000 | Sheehan et al. | 600/443 |
| 6,200,266 B1 | * | 3/2001 | Shokrollahi et al. | 600/438 |
| 6,245,016 B1 | * | 6/2001 | Daft et al. | 600/443 |
| 6,309,356 B1 | * | 10/2001 | Ustuner et al. | 600/443 |

FOREIGN PATENT DOCUMENTS

WO    WO 9955233    11/1999

OTHER PUBLICATIONS

Trobaugh et al., "A Physically Based, Probabilistic Model for Ultrasonic Images Incorporating Shape, Microstructure, and System Characteristics", IEEE Transactions, Ferroelectrics, and Frequency Control, Nov. 2001, vol. 48, pp. 1594-1605.*

(Continued)

*Primary Examiner*—Matthew C. Bella
*Assistant Examiner*—Patrick Edwards
(74) *Attorney, Agent, or Firm*—Woodcock Washburn LLP

(57) ABSTRACT

The present invention is a method and apparatus that creates a physical model of image formation and performs a random phasor sum representation of the physical model to create the probabilistic model. The physical model incorporates imaging system characteristics, gross shape and microstructure. The phasor sum representation results from a linear model of the imaging system characteristics as characterized by a point spread function. Tissue microstructure is characterized by multiple discrete scatterers distributed across a surface of the gross shape. Each discrete scatterer contributes a phasor to the phasor sum representation. The image model is formed using image pixel-based statistics. Amplitude mean, amplitude variance and a ratio of amplitude mean to standard deviation is computed at each image pixel. Based on the computations, each pixel is classified as Rayleigh or Gaussian and assigned a density function. A data likelihood is constructed as a product of the assigned density functions.

34 Claims, 10 Drawing Sheets

OTHER PUBLICATIONS

Trobaugh et al., "A Discrete-Scatterer Model for Ultrasonic Images of Rough Surfaces", IEEE Transactions on Ultrasonics, Ferroelectrics, and Frequency Control, Nov. 2000, vol. 47, pp. 1520-1529.*

"A Brief Introduction to Ultrasound", http://dukemil.egr.duke.edu/Ultrasound/k-space/node2.html.*

Abeyrante, Undantha R. et al. "*On Modeling the Tissue Response From Ultrasonic B-Scan Images*". IEEE Transactions on Medical Imaging, vol. 15, No. 4, pp. 479-490, Aug. 1996.

Cohen, Fernand S. et al. "*WOLD Decomposition of the Backscatter Echo in Ultrasound Images of Soft Tissue Organs*". IEEE Transactions on Ultrasonics, Ferroelectrics, and Frequency Control, vol. 44, No. 2, pp. 460-472, Mar. 1997.

Cramblitt, Robert M. and Bell, Mark R. "*Marked Regularity Models*". IEEE Transactions on Ultrasonics, Ferroelectrics, and Frequency Control, vol. 46, No. 1, pp. 24-34, Jan. 1999.

Liu, D.L. and Waag, R.C. "*Harmonic amplitude distribution in a wideband ultrasonic wavefront after propagation through human abdominal wall and breast specimens* ". Journal of the Acoustical Society of America, vol. 101, No. 2, pp. 1172-1183, 1997.

Lizzi, Frederic L. et al. "*Statistical Framework For Ultrasonic Spectral Parameter Imaging*". Ultrasound in Med. & Biol., vol. 23, No. 9, pp. 1371-1382, 1997.

Gilman, Larry Clifford. "*First-Order Statistics of Pulsed-Sinusoid Backscatter from Random Media: Basic Elements of an Exact Treatment*". IEEE Transactions on Ultrasonics, Ferroelectrics, and Frequency Control, vol. 44, No. 4, pp. 798-804, Jul. 1997.

Shankar, P.M. "*A model for Ultrasonic scattering from tissues based on the k distribution*". Phys. Med. Biol., vol. 40, No. 10, pp. 1633-1649, 1995.

Tuthill, T.A. et al., "*Deviations From Rayleigh Statistics In Ultrasonic Speckle*". Ultrasonic Imaging, vol. 10 , pp. 81-89, 1988.

Wagner, Robert F. et al. "*Statistics of Speckle Ultrasound B-Scans*". IEEE Transactions on Sonics and Ultrasonics, vol. 30, No. 3, pp. 156-163, May 1983.

* cited by examiner

Actual Image

Statistical Mean Image

Simulated Image

Statistical SNR₀ Image

Simulated Image

Actual Image

Simulated Images

Statistical Mean Image

Statistical SNR$_0$ Image

PHYSICALLY-BASED, PROBABILISTIC MODEL FOR ULTRASONIC IMAGES INCORPORATING SHAPE, MICROSTRUCTURE AND SYSTEM CHARACTERISTICS

RELATED APPLICATIONS

The present application claims priority from pending provisional application 60/199,418, filed Apr. 24, 2000, entitled "Image Model for Ultrasound Incorporating System Characteristics and Surface Shape and Microstructure," which is incorporated in its entirety herein by reference.

FIELD OF THE INVENTION

The present invention relates generally to imaging, and more particularly to a physically-based, probabilistic model for ultrasonic images incorporating shape, microstructure and system characteristics.

BACKGROUND OF THE INVENTION

Necessary in the art of image modeling is an accurate, physically-based, computationally feasible probabilistic model for ultrasonic images. Model-based image analysis has become increasingly popular and successful to the analysis of object shape in images. Traditional approaches, usually termed pattern or object recognition, typically involve building a pattern or object from features extracted by "processing" the image. In the model-based approach, shape is modeled rigorously then inferred using an image model. Shape can be inferred in a Bayesian setting by combining a probabilistic prior model describing variation of the shape with a data likelihood (i.e., a probabilistic model describing observations of the shape). The physics of the imaging system are incorporated using the data likelihood. Model-based approaches can provide insight and understanding regarding the process of image formation and its connection to underlying structure, thereby forming a solid foundation for inference of structural patterns in image data.

Shape is represented in ultrasound as the result of complex interactions at the microstructural level, producing a mix of speckle texture and coherent echoes. Application of model-based techniques, therefore, require a probabilistic model unique to ultrasound that accurately represents shape in terms of these interactions. Previous ultrasound applications of model-based approaches to shape analysis have been minimal and have used simplistic data models (e.g., Rayleigh with a constant parameter over a given contour). Previous applications have shown some success with simple shape models, although only in high contrast images. Because previous applications are not physically-based, the results are not extendable to other image analysis problems and little intuition or insight is developed for representing and understanding the relation between the data and the underlying shape.

For the foregoing reasons, there is a need for an accurate, physically-based, computationally-feasible probabilistic model for ultrasonic images incorporating shape, microstructure and system characteristics.

SUMMARY OF THE INVENTION

The present invention is directed to a method and apparatus for forming an image model and for developing a physically-based, probabilistic model for ultrasonic images incorporating shape, microstructure and system characteristics. The present invention accurately represents complex shape, allowing inference of underlying structural patterns in the image data.

An aspect of the present invention provides a method and an apparatus to perform the method for developing a physical model of image formation and performing a random phasor sum representation of the physical model to form a probabilistic model.

In one aspect of the present invention, forming the physical model includes formulating imaging system characteristics, formulating gross shape, formulating microstructure and incorporating the imaging system characteristics, the gross shape and the microstructure to form the image model.

In another aspect of the present invention, the imaging system characteristics can be formulated using a three-dimensional point spread function. The imaging system characteristics could also include a radio frequency image described by a linear model and characterized by the point spread function.

In yet another aspect of the present invention, the image model includes a data likelihood enabling a statistical inference to formulate underlying characteristics. The data likelihood can be formulated using image pixel based statistics.

In still another aspect of the present invention, using the image pixel based statistics can include computing an amplitude mean value, computing an amplitude variance value and computing a ratio of the amplitude mean value to a standard deviation value at each image pixel to develop a statistical image characterizing tissue. Then, classifying each pixel as Rayleigh or non-Rayleigh determined by the ratio of the amplitude mean value to the standard deviation value. Assigning a density function to each image pixel based upon the classification of each image pixel and then constructing the data likelihood as a product of the density functions.

In a further aspect of the present invention, the gross shape is described by a triangulated surface which can include a set of triangular elements defined by respective vertices and edges. Acoustic properties of the triangulated surface could be represented by multiple discrete scatterers distributed across the triangulated surface in a random model. Spatial locations of the scatterers across the triangulated surface could be parametrized by a scatterer concentration and a surface roughness.

In a still further aspect of the present invention, each discrete scatterer could contribute a phasor to the random phasor sum representation of the physical model.

Embodiments of the present invention will be seen variously:

to develop a probabilistic image model for ultrasound applicable to the Bayesian, model-based approach to image analysis;

to include the gross shape, the surface microstructure and the imaging system point spread function into the probabilistic model for ultrasound;

to develop a probabilistic model for ultrasound requiring minimal computational demands while providing accurate characterization of the pixel intensity variation across the image; and to develop a probabilistic model for ultrasound providing a representation suitable for construction of a data likelihood for the image offering smooth variation for changes in the object shape making the probabilistic model suitable to derivative based optimization techniques for inference.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

A probabilistic image model of the present invention is derived from a physical model for image formation as described in section I. The physical model describes the image formation process given a deterministic description of the gross shape, a random description of the associated microstructure, and a deterministic description of the system characteristics. For any realization of the random microstructure, a simulated image can be generated describing a "typical" system output. The probabilistic model of the present invention is based on a random phasor sum representation of the physical model and characterizes the ensemble of images that can be generated from the physical model. Statistics (mean and variance) are computed directly for each pixel and then used to assign a density function to each pixel for construction of a data likelihood (i.e., a probabilistic model describing observations of shape). Computation of the mean and variance is nontrivial, requiring several surface integrals for each pixel. General solutions for the mean and variance are developed in section II. Solutions specific to surfaces, including numerical approximations, are shown in section III.

The description of the present invention focuses on surfaces because, as a descriptor of shape, surfaces represent an important aspect of tissue with a range of ultrasonic characteristics presenting a significant challenge in image modeling. Statistics computed in the model are shown for a cadaveric vertebra. The vertebral surface provides a good medium for evaluation because of its intricate curvature and sub-wavelength roughness. Imaging of the vertebrae is also of interest in the area of treatment guidance (delivery of radiosurgery and guidance of traditional surgery) based on CT images of the spine. Ultrasonic images can provide an estimate of position and orientation of a vertebra relative to pre-operative CT images. This approach can lead to less invasive surgery and radiosurgery.

I. A Physical Model of Image Formation

Figure 2:
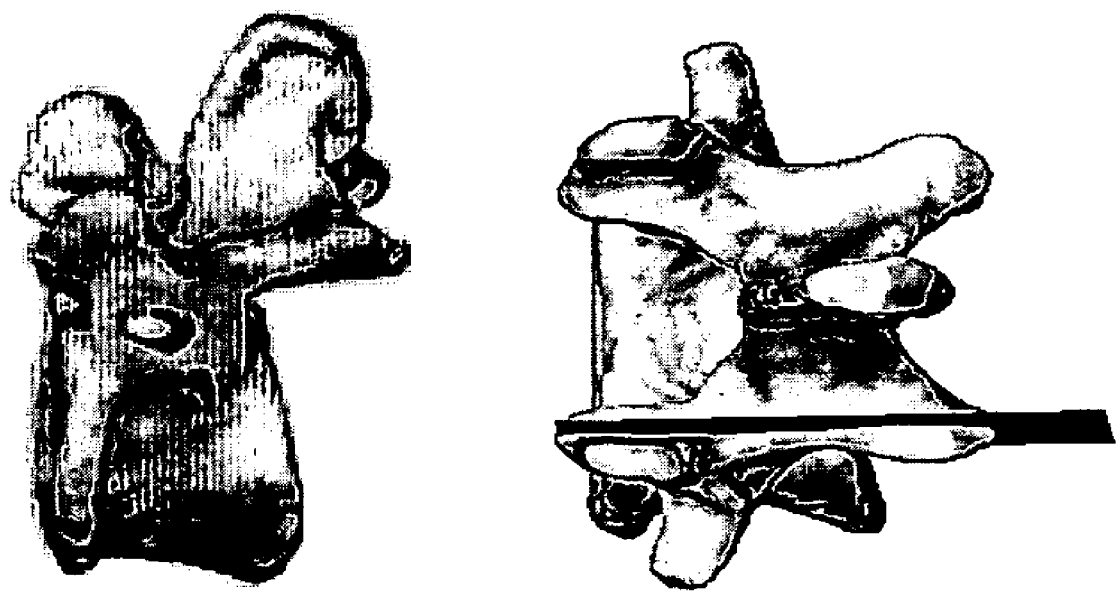
FIG. 2 illustrates approximate planes for the development of images in accordance with the present invention, the planes overlayed on a rendering of a triangulated model for the vertebral surface with transverse process shown on the left and lamina shown on the right.

The physical model for image formation provides a basis for the probabilistic image model of the present invention. A radio frequency (RF) portion of the imaging system is described by a linear model with an imaging system characterized by its point spread function (PSF). Gross surface shape is described in detail with a triangulated surface, as shown in FIG. 2. Acoustic properties of the surface are represented entirely by a collection of discrete scatterers. A random model describes spatial locations of the scatterers across a spatial extent of the surface (position is assumed to be uniformly distributed on the surface), and the surface is parametrized by a scatterer concentration (scatterers/mm$^2$) and a surface roughness.

A. Imaging System Model

A 3-dimensional (3D) volume of image data, $i_{rf}(x, y, z)$, is modeled as an output of a linear system with 3D impulse response, or point-spread function (PSF), $h(x, y, z)$, to an input of the 3D reflectivity function, $r(x, y, z)$. The reflectivity function is assumed to represent a local change in density and compressibility. Note that a density term can be included in the reflectivity function by assuming that only direct reflection (backscatter) is measured.

$$i_{rf}(x, y, z) = h(x, y, z) * r(x, y, z) \tag{1}$$

An exact description of the PSF, which characterizes the system, requires numerical modeling based on geometry of the transducer, but simpler descriptions are used to characterize the system when the exact PSF is unknown or unnecessary. A typical simplifying choice for the PSF $h(x, y, z)$ is a 3D Gaussian envelope modulating a sinusoidal waveform in the axial, z, direction, of wavenumber, $k_0$, e.g., $$h(x, y, z) = A(x, y, z)\cos(2k_0 z) \qquad (2)$$

$$A(x, y, z) = e^{\frac{-x^2}{\sigma_x^2}} e^{\frac{-y^2}{\sigma_y^2}} e^{\frac{-z^2}{\sigma_z^2}} \qquad (3)$$

where the standard deviations, $\sigma_x$, $\sigma_y$, $\sigma_z$, denote the beam widths in each of the directions.

For comparison to actual images, the envelopes of the RF images were generated along the axial dimension. Envelope detection was accomplished by taking the magnitude of the complex signal, generated with the Hilbert transform.

B. Surface Model

The surface was modeled as a collection of discrete scatterers, a representation having many advantages over a continuous representation. These advantages stem from a simplified view of the combined effects of system and tissue characteristics. In the discrete-scatter representation, each scatterer represents a major scattering element of size smaller than a wavelength. Roughness of surfaces is typically characterized in such a way that small (sub-wavelength) hills and valleys cover the surface. A hill or valley pointing in the direction of the transducer could be considered a major scattering element in the model of the present invention. A collection of small scattering elements comprises the entire acoustic representation of the surface.

Discrete representation offers the following advantages:
Computation is simplified because the small scattering elements enable a unification of structure and imaging system in a linear systems approach. For a continuous representation, the surface integral equation for the scattered wavefield requires numerical computation for each frequency of the incident wavefield and summation to calculate the image.
A similar intuitive simplicity results from considering the surface as a collection of distinct elements, with their contributions adding constructively or destructively depending on phase separation, rather than considering the solution to a surface integral equation.
The discrete-scatterer model allows use of the convenient random-walk analysis of scattering. Most probabilistic models are based on the random-walk analysis model, providing an extensive background of previous work for the development of a new probabilistic image model.

The gross surface is represented as a triangulated surface (i.e., a set of triangular elements defined by their vertices and edges). The triangulated surface representation can be easily produced from a volume segmentation using the Marching Cubes algorithm. While only the triangles are used, the triangulated surface representation inherently defines second-order (curvature) information, which can be used to accurately describe the surface. Several computational algorithms exist in the computer graphics arena for the manipulation of these surfaces.

The discrete version of the triangulated surface permits a wide variety of medium parametrization. Scatterer spacing on the surface can be characterized in many ways, from completely regular spacing to random spacing. In addition to spacing, the surface can be characterized by scatterer concentration. Surface roughness can also be incorporated independently as a perturbation of each scatterer in a direction normal to the surface.

Any choice for distributing scatterers on the surface results in a discrete representation consisting of a collection $X = \{(x_i, y_i, z_i), i \in [1, \ldots, N]\}$ of N scatterers, with scatterer i of amplitude $A_i$ at position $(x_i, y_i, z_i)$. The reflectivity function consists of a sum of appropriately scaled 3D delta functions, $\delta(x_i, y_i, z_i)$, $$r(x, y, z) = \sum_{i=1}^{N} A_i \delta(x - x_i, y - y_i, z - z_i) \qquad (4)$$

The RF image is then a sum of a scaled and a delayed version of the PSF, $$i_{rf}(x, y, z) = h(x, y, z) * r(x, y, z) \qquad (5)$$

$$= \sum_{i=1}^{N} A_i h(x - x_i, y - y_i, z - z_i) \qquad (6)$$

In the frequency domain, the convolution is a product allowing the tissue response to be represented as a sum of scaled delay terms, $$I_{rf}(u, v, w) = H(u, v, w) R(u, v, w) \qquad (7)$$

$$= H(u, v, w) \sum_{i=1}^{N} A_i e^{-j(ux_i + vy_i + wz_i)} \qquad (8)$$

The system response is assumed bandlimited, thus the image response can be computed exactly for any number of scatterers, without the limitation on scatterer positions imposed by a uniform grid approach. Computation can be performed in the spatial domain as a sum of shifted versions of the PSF. Alternatively, a complete tissue response can be computed in the frequency domain with the image computed using an inverse transform of the product of tissue and system responses.

Inherent in the model are a number of assumptions. In the linear model, the Born approximation is assumed. It is also assumed that a similar representation would be valid for other gross shapes (e.g., volumes, curves and points), which are necessary for describing a typical tissue medium. For the vertebra, the bony surface is assumed to completely attenuate the beam, thus the surface is currently processed to remove occluded elements from view. Soft tissue surfaces are expected to be similar in basic appearance (i.e., presence of coherent echoes and speckle texture). Note that for a tissue comprised of a surface surrounding a volume of scattering structure, an additional model would be included to represent the interior volume.

II. Amplitude Mean and Variance via the Random Phasor Sum

The image model requires a probability density function describing the echo amplitude at each image pixel. In the present invention, the amplitude is characterized by its mean and variance at every image pixel with comprehensive treatment of the shape, microstructure and system characteristics. The derivation begins with a random phasor sum representation of the physical model of image formation.

A. Image Formation as a Random Phasor Sum Representation of the Physical Model The phasor sum model of the present invention results from a linear model for a radio frequency (RF) image, where the imaging system is characterized by its point spread function (PSF), or impulse response, and tissue is characterized by its reflectivity function. With a discrete model for the tissue reflectivity, each scatterer contributes a phasor. At any image pixel, with position $r \in IR^3$, the quantity of interest is the amplitude of the phasor sum, $i(r)$, which has the following form, $$i(r) = \sum_{i=1}^{N_r} q_i A(r; r_2) e^{j\phi_2} \quad (1)$$

where $N_r$ is the number of scatterers in the pixel's resolution cell, and, for each scatterer i, $q_i$ is the reflectivity, $r_i = (x_i, y_i, z_i)$ is the scatterer position, $A(r; r_i)$ is the position-dependent amplitude of the PSF envelope, and $\phi_1 = -2k_0 z_i$ is the position-dependent phase where $k_0$ is the center wavenumber of the transducer. For simplification, the scatterer strength and envelope amplitude can be combined as $A_i = q_i A(r; r_i)$ to denote the phasor amplitude for scatterer i.

For any tissue of interest, including the discrete-scatterer surface model, components of the phasor sum are random. For a given image pixel, the strengths, locations, and number of scatterers in the pixel resolution cell are random and produce random amplitude, $A_i$, and phase, $\phi_i$, in ways that depend on the system PSF. Furthermore, for a given surface shape, these interactions change at every pixel, motivating the comprehensive model of the present invention.

Computation of the mean and variance of the phasor sum amplitude involves characterization of the amplitude in terms of probability densities for elements of the random phasor sum (i.e., N, A, and $\phi$). By assuming that the complex phasor sum is complex Gaussian, the sum can be characterized straightforwardly in terms of the system PSF, underlying shape and microstructure of the medium. The amplitude mean and variance at each pixel can then be computed from the associated parameters for the complex Gaussian density.

B. A Gaussian Approximation to the Complex Sum

Typically, N is assumed to be large enough that the sum is complex Gaussian. Formally, this condition holds asymptotically and requires some independence assumptions. Practically, the sum can be considered complex Gaussian for N. The sum can be written in terms of its real and imaginary components, denoted $x(r)$ and $y(r)$, respectively, as $$i(r) = \sum_{i=1}^{N_r} A_2 e^{j\phi_2} \quad (2)$$

$$= \sum_{i=1}^{N_r} A_2 \cos\phi_2 + j \sum_{i=1}^{N_r} A_2 \sin\phi_2 \quad (3)$$

$$= x(r) + jy(r) \quad (4)$$

In general, for a complex random variable. $x+jy$, the complex Gaussian density is given by $$p_{x,y}(x,y) = \frac{\exp\left\{-\frac{\frac{(x-\mu_x)^2}{\sigma_x^2} - 2r(x-\mu_x)\frac{(y-\mu_y)}{\sigma_x \sigma_y} + \frac{(y-\mu_y)^2}{\sigma_y^2}}{2(1-r^2)}\right\}}{2\pi\sigma_x\sigma_y\sqrt{1-r^2}} \quad (5)$$

where $\mu_x$ and $\sigma_x^2$ are the mean and variance of the real component, $\mu_y$ and $\sigma_y^2$ are the mean and variance for the imaginary component, and $$r = \frac{E(xy) - E(x)E(y)}{\sigma_x \sigma_y}$$

is the correlation coefficient. Several assumptions are usually made to simplify this form, but, since some of those assumptions will not always hold, the complete form is retained here. For any densities describing N, $A_i$ and $\phi_i$, the complex sum can be characterized by computing the means and variances of the real and imaginary components and the correlation coefficient.

The typical assumptions made in the phasor sum analysis involve the following:
1. Independence of individual phasor quantities, $A_i \perp A_j$, $\phi_i \perp \phi_j$, $i \neq j$,
2. Independence of the number of scatterers from other quantities,
3. Independence of amplitude and phase for each phasor, $A_i \perp \phi_i$,
4. Identically distributed amplitudes and phases,
5. Symmetric phase distributions that allow rotating the phasor sum to align with the real axis.

For surfaces, assumptions (3) and (5) are too strong to hold at all times, therefore only (1), (2) and (4) are assumed.

C. Computing the Complex Gaussian Parameters

The r dependence, indicating the pixel basis for the sum, is dropped from the notation for the rest of this paper, although the importance of the implied pixel basis of the model cannot be understated. The parameters are given by the following equations:

$$\mu_x = E(N)E(A_i \cos\phi_2) \quad (6)$$

$$\mu_y = E(N)E(A_2 \sin\phi_2) \quad (7)$$

$$\sigma_x^2 = E(N)E(A_i^2 \cos^2\phi_i) + \sigma_N^2 E^2(A_i \cos\phi_i) \quad (8)$$

$$\sigma_y^2 = E(N)E(A_2^2 \sin^2\phi_2) + \sigma_N^2 E^2(A_2 \sin\phi_2) \quad (9)$$

$$r = \frac{1}{\sigma_x \sigma_y}[E(N)[E(A_i^2 \cos\phi_2 \sin\phi_2) -$$

$$E(A_i \cos\phi_2)E(A_i \sin\phi_2)] +$$

$$\sigma_N^2 E(A_i \cos\phi_2) E(A_i \sin\phi_2) \quad (10)$$

All the expressions depend only on the first and second moments of N, $A_i \cos\phi_i$ and $A_i \sin\phi_i$. Given a shape model, these quantities will generally vary at the pixel level and must be computed from phase, amplitude and number densities derived specifically for each pixel. From a computation of these five parameters for every pixel in the image, amplitude mean and variance is computed, followed by construction of a data likelihood. For surfaces, these results are computed using numerical integration techniques.

The assumptions that are typically made in phasor sum analyses of scattering simplify the expressions. First, if amplitude and phase are considered independent for each scatterer ($A_i \perp \phi_i$), all expectations involving $A_1$ and $\cos \phi_i$ or $\sin \phi_i$ can be computed as products of expectations, e.g., $E(A_i \cos \phi_i)\overline{A_i \perp \phi_i} E(A_{ij})E(\cos \phi_i)$. If, in addition, the phase is assumed to be symmetric about zero, the expected value of $\sin \phi_i$ is zero, and the mean, $\mu_y$, of the imaginary component becomes zero as does the correlation coefficient, r. While these assumptions provide convenient simplifications, the results do not hold, in general, for surfaces.

D. Computing the Amplitude Mean and Variance

The amplitude of the complex sum is the quantity of interest in characterizing clinical images. In the present invention, accuracy in the form of pixel densities is weighed against accuracy in describing the differences in pixel densities. Of special importance in a model-based approach to shape analysis is how the densities vary when the shape changes (i.e., when the likelihood of a different transformation of the shape is being assessed). Accordingly, the mean and variance of the amplitude are appropriate choices for a first approximation.

For the amplitude of the complex sum, $\rho = \sqrt{x^2 + y^2}$, the mean, $\mu_\rho$, is computed as an expectation over the complex Gaussian density, $$\mu_\rho = E(\sqrt{x^2 + y^2}) \quad (11)$$

$$= \int\int \sqrt{x^2+y^2} \frac{1}{2\pi\sigma_x\sigma_y\sqrt{1-r_2}}$$

$$e^{-\frac{1}{2(1-r^2)}\left[\frac{(x-\mu_r)^2}{\sigma_x^2} - 2r(x-\mu_i)\frac{(y-\mu_y)}{\sigma_i\sigma_y} + \frac{(y-\mu_y)^2}{\sigma_y^2}\right]} dxdy \quad (12)$$

In general, no closed form solution exists for this integral, thus it is computed for the image model numerically using Simpson's rule.

In contrast to the mean, the variance is quite simple to calculate. Starting with the standard expression for the variance, a relationship is stated in terms of the second moments of the real and imaginary components and the amplitude mean, $$\sigma_\rho^2 = E(\rho^2) - E^2(\rho) \quad (13)$$

$$= E(x^2) + E(y^2) - \mu_\rho^2. \quad (14)$$

For the image model of the present invention, the amplitude mean and variance are the final result. Recall that these quantities are computed from the five parameters for the complex Gaussian as in Equations 6 through 10 of this section (i.e., section II-B). Those coefficients and the associated amplitude statistics change for each pixel. For surfaces, the computations require surface integrals, as described in section III.

E. The Rayleigh density—an Important Special Case

For many pixels, the combination of local surface geometry, microstructure and system PSF will produce statistics that satisfy the Rayleigh density, parameterized by a single constant $\alpha$, $$p_\rho(\rho) = \frac{\rho}{\alpha^2} e^{-\frac{\rho^2}{2\alpha^2}} \quad (15)$$

The importance of the Rayleigh density in this work is the need to assign a density function to each pixel for construction of a data likelihood.

The mean of a Rayleigh-distributed random variable is $$\mu_\rho = \alpha\sqrt{\frac{\pi}{2}} = \frac{1}{2}\sqrt{\pi E(N)E(A_i^2)} \quad (16)$$

The variance, $\sigma_\rho^2$, is given by $$\sigma_\rho^2 = \left(2 - \frac{\pi}{2}\right)\alpha^2 = \left(1 - \frac{\pi}{4}\right)E(N)E(A_i^2) \quad (17)$$

The simplicity of these relations between the Rayleigh mean and variance and the moments of N and $A_i$ makes the Rayleigh density the choice for the image model of the present invention. The difficulty is in classifying a given pixel as Rayleigh or non-Rayleigh. In this regard, an important quantity is the ratio of the mean to the standard deviation, often termed the $SNR_0$, which has a constant value of 1.91 for a Rayleigh density, $$SNR_0 = \frac{\mu_1}{\sigma_1} = 1.91 \quad (18)$$

Because this ratio is a constant, it is used to classify a pixel as Rayleigh or non-Rayleigh. Specifically, once the amplitude mean and variance are computed (as in the expressions of the previous sections), the $SNR_0$ is computed, and the result determines whether to approximate a pixel as Rayleigh or non-Rayleigh. Note that a Rayleigh density implies an $SNR_0$ value of 1.91 but that the converse is not necessarily true.

III. Amplitude Mean and Variance for Surfaces

The amplitude mean and variance for each pixel are computed from the parameters for the complex Gaussian. The parameters are used to characterize images of surfaces. From Equations 6 through 10 of section II-B, the parameters are found in terms of the local, pixel-based moments for N, the number of scatterers, and the products of amplitude, $A_i$, and phase, $\phi_i$, $A_i \cos \phi_i$, and $A_i \sin \phi_i$. All of the moment computations require surface integrals, where the region of interest is the local intersection of the surface and the PSF resolution cell. The resolution cell is defined simply as a region around the pixel location in which scatterer contributions are included. Of importance is the intersection surface, $S \cap$, defined as the intersection of the gross tissue surface and the local resolution cell.

A. Computing Moments of N, $A_i$ and $\phi_i$ for Surfaces

The moments of N and $A_i \cos \phi_i$ require different computational approaches. Depending on the model used for the number of scatterers, N, the moments for N depend in some way on the area of the intersection surface, $S \cap$, $$\text{Area}(S \cap) = \int\int_{S \cap} dA \quad (19)$$

In Section V, Results, N is modeled as deterministic. With the surface microstructure to parameterized in terms of the scatterer concentration, the moments for N depend only on the product of the scatterer concentration and the intersection area.

The first and second moments for the necessary functions of $A_i$ and $\phi_i$ require computations in addition to the area of intersection. Scatterer amplitude and phase are both functions of scatterer position, which is assumed to be uniformly distributed on the surface. Expected values for functions of that position can, thus, be computed with respect to a density for scatterer position. For scatterers uniformly distributed over the surface, the density on the scatterer position, r, is simply the reciprocal of the area of intersection, $$\rho_r(r) = \frac{1}{\int_{S_\rho} dA} \text{ for } r \in S_\cap \quad (20)$$

The expectation of $A_i$, $\cos \phi_i$, for example, is then given by a surface integral defined in terms of position, r, $$E(A_i \cos\phi_i) = \int\int_{S_\cap} A_i(r)\cos\phi_i(r)\rho_r(r) dA \quad (21)$$

$$= \frac{1}{Area(S_\cap)} \int\int_{S_\cap} A_i(r)\cos\phi_i(r) dA \quad (22)$$

Other moments for products of the amplitude and phase require similar surface integrals because the moments are all functions of position.

Computation of the parameters of the complex Gaussian involves solving various forms of the surface integral. The approach selected computes the moments directly from the triangulated surface.

B. Numerical Approximations to the Moments

Numerical approximations to the moments employs approximations to the integrals based on the triangles of the surface representation. The area of intersection is approximated as a sum over those triangles in the resolution cell, $$Area(S_\cap) = \int\int_{S_\cap} dA \approx \sum_{\Delta_i \in S_\cap} Area(\Delta_i) \quad (23)$$

The expectation of the amplitude and cosine of the phase is given as follows with the associated numerical approximation, $$E(A_i \cos\phi_i) = \int\int_{S_\cap} A_i(r)\cos\phi_i(r)\rho_r(r) dA \quad (24)$$

$$\approx \frac{1}{Area(S_\cap)} \sum_{\Delta_i \in S_\cap} \int\int_{\Delta_i} A_i(r)\cos\phi_i(r) dA \quad (25)$$

If the amplitude is approximated as constant over the triangle with the value at the triangle midpoint, $A_i(r\Delta i)$, the computations are simplified further because the integral of the cosine of the phase can be calculated analytically, $$E(A_i \cos\phi_i) \approx \frac{1}{Area(S_\cap)} \sum_{\Delta_i \in S_\cap} A_i(r\Delta_i) \int\int_{\Delta_i} \cos\phi_i(r) dA \quad (26)$$

The remaining expectations of functions of $A_i$ and $\phi_i$ can be computed similarly with analytical results for integrals of the trigonometric functions.

The phase contribution is computed analytically, therefore the accuracy of the computations depends on approximating the amplitude as constant over a triangle and approximating the intersection surface by triangles from the original surface. Triangles are easily resampled to any desired area, thus the approximations involved (i.e., approximating the amplitude as constant over each triangle and approximating the intersection surface by triangles) are as accurate as desired without increased computation.

C. Surface Roughness

The discrete-scatterer model for tissue surface includes a model for surface roughness. The surface roughness is modeled as a Gaussian perturbation of each scatterer in a direction normal to the surface. The physical perturbation implied by the roughness model has not been incorporated into the image model for the sake of simplicity. Note that the discrete scatterer model itself inherently implies a roughness. Adding the physical perturbation is simple in theory but difficult in computation. If the roughness were modeled as uniform instead of Gaussian, the surface integrals of the previous section would be volume integrals. The volume integrals would only be significant for the integration of the cosine of the phase over each triangle and could be calculated analytically. For the present invention, the additional parameter has little effect since roughness is assumed to be small (e.g., a uniform density of widths 0.1 to 0.2 wavelengths).

IV. Methods

In Section V, Results, several images are shown for each of two image planes on a vertebra to demonstrate various features of the model. For each image plane, the following images are displayed: (1) an actual ultrasound image, (2) several images simulated for different realizations of the random microstructure, and (3) statistical mean, standard deviation and $SNR_0$ images. The actual images are registered with the others using methods and equipment from image-guided surgery, including optical localization for tracking the ultrasound probe and methods for registration of the images and vertebra. The simulated images were generated from the physical model and the statistical images were computed in accordance with Section III to characterize all images producible from the physical model.

A. Collection of Actual Images

Figure 1:
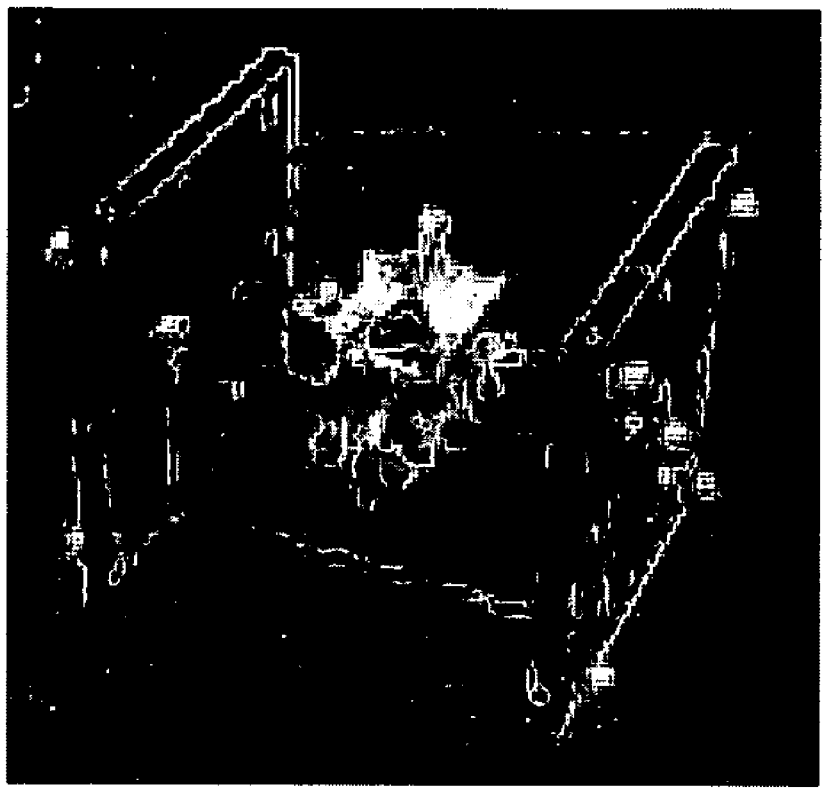
FIG. 1 illustrates a phantom containing a lumbar vertebra constructed to allow registration of CT images, a vertebra triangulated surface representation and ultrasonic images in accordance with the present invention.

A phantom cadaveric L4 lumbar vertebra is shown in FIG. 1. The phantom was scanned with a CT imaging system to produce an image volume from which the vertebra was segmented, allowing the construction of a triangulated surface. A rendering of the triangulated surface is shown in FIG. 2. Ten aluminum spheres were mounted on the outside of the phantom to allow for registration of the physical phantom to the CT images.

Ultrasonic images were acquired using an imaging system from the Tetrad Corporation, Englewood, Colo. A model 6C, 128-element, linear array transducer was used. Focus for the transducer is fixed in the elevation dimension and electronic in the lateral dimension. Relevant specifications for the transducer include a center frequency of 6.0 MHz and elevation focus at 33 mm. Based on information from the manufacturer, beam width was approximately 1.0 mm in the lateral direction throughout most of the image and approximately 3.0 mm in the elevation direction (at a depth of 40 mm). The imaging system used, the transducer design and the overall operation of this selection are representative of conventional imaging systems.

The ultrasound probe was modified to allow tracking with an optical localization system. The accuracy of using this method to track the position of objects identified in the ultrasonic image was measured to be approximately 2 mm. By tracking the probe with the same system used to register the phantom and CT images, ultrasonic images were acquired in known relation to the surface model, allowing for a direct comparison between simulated and actual images.

B. System PSF Model

For the simulations and statistical computations, the system was modeled using a Gaussian PSF envelope following, $$A(r; r_i) = \exp\left\{\frac{(x-x_i)^2}{\sigma_x^2} - \frac{(y-y_i)^2}{\sigma_y^2} - \frac{(z-z_i)^2}{\sigma_z^2}\right\}.$$

The center frequency, $f_c$=6.0 MHz, was given by the manufacturer. The PSF was assumed spatially invariant for this study, and the elevation and lateral PSF widths, $\sigma_y$=1.5 mm and a $\sigma_x$=0.5 mm, were calculated from equations given by the manufacturer. The axial width, $\sigma_z$, was chosen to be 0.2 mm. It was selected from a range of approximately 0.15 to 0.4 mm based on visual comparison of actual images (from the Tetrad system) to images simulated with the various values for the width.

C. Surface Model Implementation—Simulation Procedure

In images of bone surfaces, attenuation is a significant effect that warrants consideration. Therefore, it is assumed that bone is completely attenuating, or occluding. Before the discrete scatterers are generated, the surface is modified to account for the effect of attenuation. A ray-tracing approach is used to determine visibility and is implemented using a modified version of a computer graphics algorithm known as Hidden Surface Removal. In typical use of this algorithm for rendering a surface to a display, each triangle is projected onto the viewing plane, rasterized according to the display grid, and processed under lighting assumptions to generate an intensity value. During processing, the depth (Z) at each screen pixel is stored in a "Z buffer" so that only the closest triangle is displayed. The index of the closest triangle is stored instead of the rendering intensity, and, instead of displaying the Z Buffer, its contents are used to remove those triangles that were not visible to the transducer. An alternative method would be to "clip" those triangles which are partially occluded. This alternative is computationally intense.

After accounting for occlusion, a collection of discrete scatterers are generated for the remaining triangles to form the acoustic model of the surface. The distribution of scatterers are parametrized on the surface according to scatterer concentration (scatterers/area) and surface roughness. For each triangle, the number of scatterers is calculated as a product of triangle area and scatterer concentration. The in-plane position of each scatterer is then generated from a 2D uniform distribution over the triangle. Scatterer position, $y \in \mathbb{R}^3$, is generated from two uniformly-distributed random variables, $\lambda_1$ and $\lambda_2$ for triangle vertices, $x_1, x_2, x_3 \in \mathbb{R}^3$ as follows:

1. Generate $\lambda_1, \lambda_2 \sim U[0, 1]$ until $\lambda_1+\lambda_2 \leq 1$
2. $y = x_3 + \lambda_1(x_1-x_3) + \lambda_2(x_2-x_3)$ where the triangle borders and interior are represented by the combination of the point X3 and the vectors $x_1-x_3$ and $x_2-x_3$ with $\lambda_1, \lambda_2 \epsilon [0, 1]$. After the in-plane position is determined for each scatterer, it is perturbed in the direction normal to the surface to account for surface roughness. The perturbation is generated from a Gaussian distributed random variable, with roughness characterized by the standard deviation of that perturbation.

A surface scatterer concentration between 50 and 150 scatterers/mm$^2$ are used. For surface roughness, standard deviations between 0.001 and 0.1 mn are used. Changes in the concentration and roughness yielded modest changes in the images. The most visible change was a decrease in the coherent scattering sites when the roughness was nearly one wavelength. In the present examples, scatterer concentration of 64 scatterers/mm2 and surface roughness of 0.01 mm were used because texture and intensity produced in the simulations were similar to that of the actual images.

D. Computing μ, σ, and SNR$_0$ for Each Pixel

The statistics were computed at each pixel in accordance with Section III. Surface integrals were computed using the numerical approximations listed in subsection III-B. For each pixel, the five parameters of the complex Gaussian were computed as in equations 6 through 10 of section II-B, followed by computation of the amplitude mean and variance as in equations 12 and 14, respectively, of section II-B. Computations are performed for each triangle, with the results contributed to the appropriate pixels.

V. Results

Statistics computed for all of the image pixels constitute a representation of the ensemble of images available from the physical model and, as such, provide a representation of shape in the images. Statistical images (e.g., μ, σ, and SNR$_0$) provide the basis for a data likelihood but also give a representation of the ultrasonic properties of the tissue medium that is fundamentally different from conventional B-mode images. FIGS. 3 through 6 represent two different planes on the cadaveric vertebra, as illustrated in FIG. 2. The first image plane shows the transverse process, providing good detail over a small region. The second plane shows the lamina and articular processes and shows a larger region of the vertebra, with a broader range of image features.

For each image plane, an actual image is shown with sample simulated images representative of those possible from the physical model. The statistical mean, standard deviation and SNR$_0$ images are also shown. The statistical images are computed directly using the methods of Section III.

A. A Sagittal Image of the Transverse Process

The first set of images represent the sagittal plane of the transverse process of the cadaveric vertebra marked in the left of FIG. 2. The plane corresponds approximately to the plane of the actual image in FIG. 3. That actual image was acquired by imaging carefully along the transverse process and searching for the brightest (most coherent) echo. The sensitivity to angle was such that when imaging by hand, even the slightest wobble of the probe changed the image substantially. Consequently, this plane represents a challenging surface geometry for the image model since the curvature is substantial and varied relative to the PSF widths and wavelength.

Figure 3:
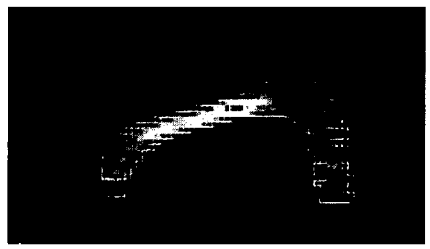
FIG. 3 illustrates an actual image at top left and two simulated images at bottom left of the transverse process with corresponding statistical images at right, the images developed in accordance with the present invention, where the images show only the small, approximately 6 mm axially and 15 mm laterally, portion of the entire image that represent scattering from the transverse process, the statistical images show the variation of the mean, and SNR0 across the image.
Figure 3:
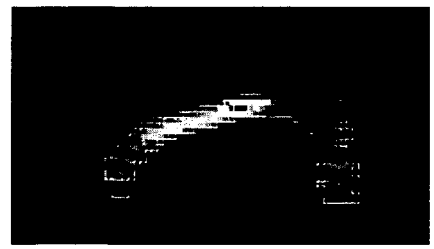
Figure 3:
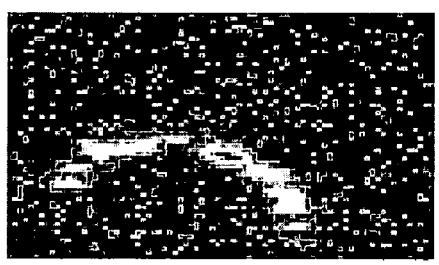
Figure 3:
Figure 3:
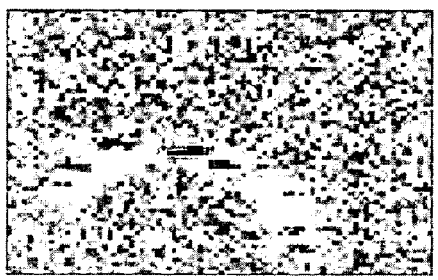

In the left column of FIG. 3, the actual image is shown above two of the infinite set of possible simulated images. Substantial variation exists among the simulated images and is representative of the variability expected from the physical model. The actual image appears quite similar to the simulated images in shape, but the actual image seems to have a wider region of bright echoes along the top of the process with a greater relative amplitude to the other echoes. Close inspection of the shape in the images shows that it is visibly rotated counter-clockwise in the simulated images. Given the sensitivity to the angle of insonification, such a change could easily account for many of the differences between the images. These differences are unavoidable since the tracking error is on the order of 2 mm.

The statistical images show the variation of the statistics across the entire image. Dependence on the PSF is evident as the amplitude drops off with distance from the surface. A bright region of relatively high amplitude is present in the center of the transverse process. From the surface alone, it is difficult to predict that such a region is produced. This scattering comes from a very small, flat portion of the surface and is indicative of the high sensitivity to the surface geometry and angle of insonification. The high (greater than the Rayleigh 1.91) value in the $SNR_0$ image shows that the region is not Rayleigh-distributed.

B. An Image Plane Along the Lamina and Articular Processes

Figure 4:
FIG. 4 illustrates an actual image at the top and three simulated images below of the lamina and articular processes, the images developed in accordance with the present invention, where, from right to left, anatomical structure are the facet joint on the left (Rayleigh scattering with wide axial extent), lamina in the center (non-Rayleigh scattering with relatively high amplitude), and inferior articular process on the right (mix of Rayleigh scattering on the sides and non-Rayleigh scattering at the peak)
Figure 4:
Figure 4:
Figure 4:

The sagittal plane shown on the right of FIG. 2 represents a large region of varying surface curvature, featuring both Rayleigh and non-Rayleigh regions as well as substantial contributions from the out-of-plane surface in the facet joint (left side of the image). FIG. 4 shows the actual image and three representative simulated images of the lamina plane. The lamina and inferior articular process show relatively high-amplitude scattering in all of the images, with the lamina producing a higher amplitude more consistently. The facet joint is marked by Rayleigh scattering with slowly decreasing amplitude toward the top of the image. This slow decrease in amplitude results because the image plane is nearly parallel to the facet joint surface, with out-of-plane contributions decreasing slowly (due to increase in distance from the image plane) over a large axial range.

Figure 5:
FIG. 5 illustrates statistical images of the lamina and articular processes with regions of non-Rayleigh scattering existing along the lamina and peak of the articular process, the images developed in accordance with the present invention.
Figure 5:

Statistical images for the lamina are shown in FIG. 5. Sites of non-Rayleigh scattering on the lamina and peak of the articular process are evident from the mean and $SNR_0$ images. The greater $SNR_0$ along the lamina could be due to an angle of incidence closer to normal than that of the articular process, although it would be difficult to predict by looking at the surface because of the relative flatness of the articular process and its wider extent. This ambiguity is another indication of the high sensitivity of the interactions between surface and PSF that produce highly variable ultrasonic images. Breaks in the non-Rayleigh region along the lamina are due to phase effects and can also be seen in the simulated images. Similar breaks would be present as artifacts in the non-Rayleigh regions if scatterer amplitude and phase had been assumed independent.

VI. Discussion

The Rayleigh/non-Rayleigh characterization of surface images does capture the basic appearance of surface shape in both the actual and simulated images. Rayleigh and non-Rayleigh scattering occurs with a dependence roughly on the orientation of the local surface normal with respect to the axial image dimension. This approach is applicable to other tissue surfaces (soft tissue, in particular) and to most conventional imaging systems.

The value of the image model is its basis at the pixel level. That basis is especially important for shape because shape must be represented across the entire image. The only change at each pixel was the local influence of the shape since the PSF was assumed to be spatially invariant and the microstructure homogeneously distributed across the surface. In other problems (e.g., phase aberration or attenuation estimation) the PSF may change at each pixel. By modeling those changes at each pixel, a likelihood could be created that would permit inference of the changes in the PSF or attenuation across the image. In those problems, a prior model would be expected to provide a substantial boost in performance.

A. Accuracy of Computed Statistics

The amplitude statistics employed approximations to the underlying model. The computed images shown are accurate in non-Rayleigh distributed regions given the high sensitivity to the underlying interactions. An assumption of amplitude phase independence, as is typically done in computing density functions for scattering problems, would significantly compromise the integrity of the model in the non-Rayleigh regions. Visually, the difference of such a choice might be small, but the present invention can be directed to the variation of likelihood as assumptions about the underlying structure (e.g., the surface shape) are changed. Accordingly, performance in pose estimation for a vertebra model is one potential utility of the probabilistic model of the present invention.

B. Computational Requirements

The results are generated using algorithms coded in both MATLAB™ and C++. Computation times were measured for the sagittal-plane lamina images. The surface region of interest contained approximately 10,000 triangles after resampling by a factor of four. The image region was 40×280 pixels. Calculation times listed are for a Silicon Graphics Indy workstation. In MATLAB™, computation time for the image statistics was approximately 40 minutes per image plane. The same computations performed with C++ code required approximately 8 seconds. The massive speedup is due to the relative speeds of the two programming environments for calculations involving surface triangles and table lookups for approximation of the amplitude mean. The computational load is especially important in inference applications since the mean and variance must be computed for each image several times (in finite-difference approximations of the local gradient of the likelihood) for each iteration of a derivative-based optimization algorithm. For pose estimation for the vertebra, between 200 and 300 image calculations were typically required for convergence, when using a quasi-Newton BFGS algorithm.

C. A Data Likelihood

One objective of the image model was to generate a form capable of constructing a data likelihood for inference. A data likelihood, $p(X|h)$, characterizes all observation data (i.e., all image pixel measurements) with a single probability density function, where the data, $X=\{x_i, i=1, 2, \ldots, N_x\}$, is the set of image pixels, $x_i$ and h is some transformation of the surface (e.g., the rotation and translation comprising the surface pose). Assuming that all pixels are independent, the data likelihood reduces to a product of probability density functions, $p_{xi}(x_i)$, $$p(X \mid h) = \prod_{i=1}^{N_x} p_{x_i \mid h}(x_i \mid h) \qquad (27)$$

From the mean and variance at any pixel, the pixel is represented as either Rayleigh or Gaussian, depending on the value of $SNR_0$ at the pixel. The data likelihood is then a product of Rayleigh and Gaussian probability density functions with parameters ($\alpha_i$ for $x_i$ Rayleigh and $\mu_i$, $\sigma_i$, for $x_i$ Gaussian) derived from the system and surface characteristics, $$p(x \mid h) = \prod_{x_i Rayleigh} \frac{x_i}{\alpha_i^2} e^{\frac{x_i^2}{2\alpha_i^2}} \prod_{x_j Gaussian} \frac{1}{\sqrt{2\pi\sigma_j^2}} e^{\frac{(x_j - \mu_j)^2}{\sigma_j^2}} \qquad (28)$$

where the dependence on the pose, h, is implicit but not shown.

The likelihood serves the purpose of a cost function, or objective function, for estimating the surface transformation. The log likelihood, the logarithm of the likelihood, preserves the maxima and is simpler to compute in this case because the product becomes a sum.

$$\ln p(X \mid h) = \qquad (29)$$

$$\sum_{x_i Rayleigh} \ln \frac{(x_i)}{\alpha_i^2} - \frac{x_i^2}{2\alpha_i^2} - \sum_{x_j Gaussian} \frac{1}{2} \ln(2\pi\sigma_j^2) + \frac{(x_j - \mu_j)^2}{\sigma_j^2}$$

D. Inference

Figure 6:
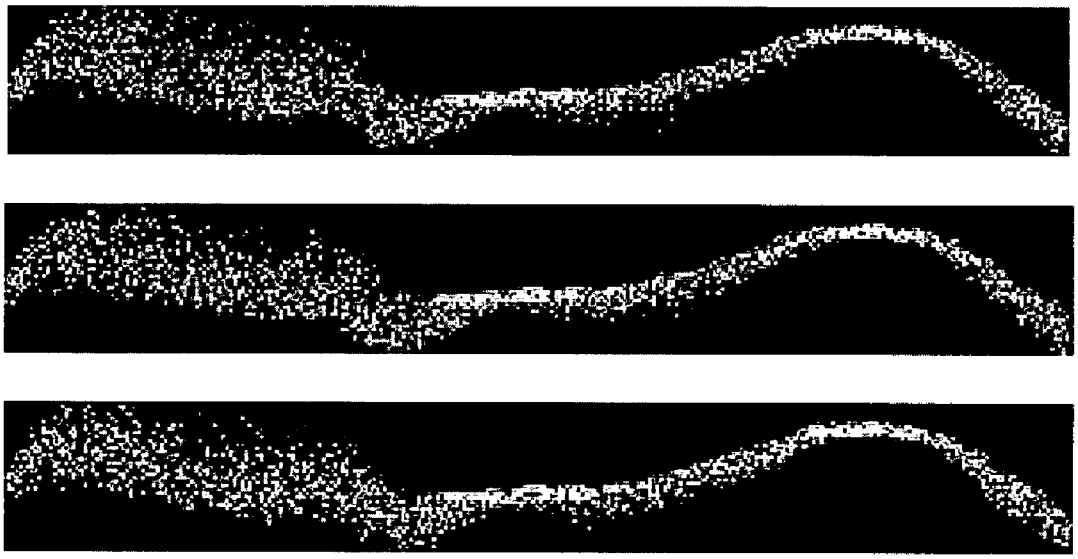
FIG. 6 illustrates samples of a Rayleigh/Guassian image model of the lamina with pixel intensities generated using computations in accordance with the present invention.

The representation of shape provided by the image model is illustrated in FIG. 6. The images in FIG. 6 were generated from the Rayleigh/Gaussian-distributed image model for the lamina image plane. These images can be compared to the simulated images of FIG. 4, which were realized directly from the physical model.

The Rayleigh/Gaussian images capture significant information about the shape in the image. The relative amplitudes of regions across the image are similar in both sets of images. The differences between the images simulated from the physical model and the samples taken from the Rayleigh/Gaussian image distribution are in the image texture. Since neighbor interactions are not incorporated in the image model, none of the resulting texture should be expected. Inclusion of texture in the image model would be challenging because of the increase in representation (the joint density over a pixel and its neighbors is substantially more complex than the individual density). Application of Markov Random Field models could be promising in terms of representing the local effects. While representation of the texture might not be useful in inference of shape, it would be correlated with the system characteristics, thus providing a key to inference of those characteristics (e.g., the widths of the PSF).

Accordingly, the above Sections describe various methods and apparatus for forming an image model and for developing a physically-based, probabilistic model for ultrasonic images to accurately represent shape. The models allow inference of underlying structural patterns in the image data. The present invention further includes computer readable media that configures a computer to perform the methods described herein.

Figure 7:
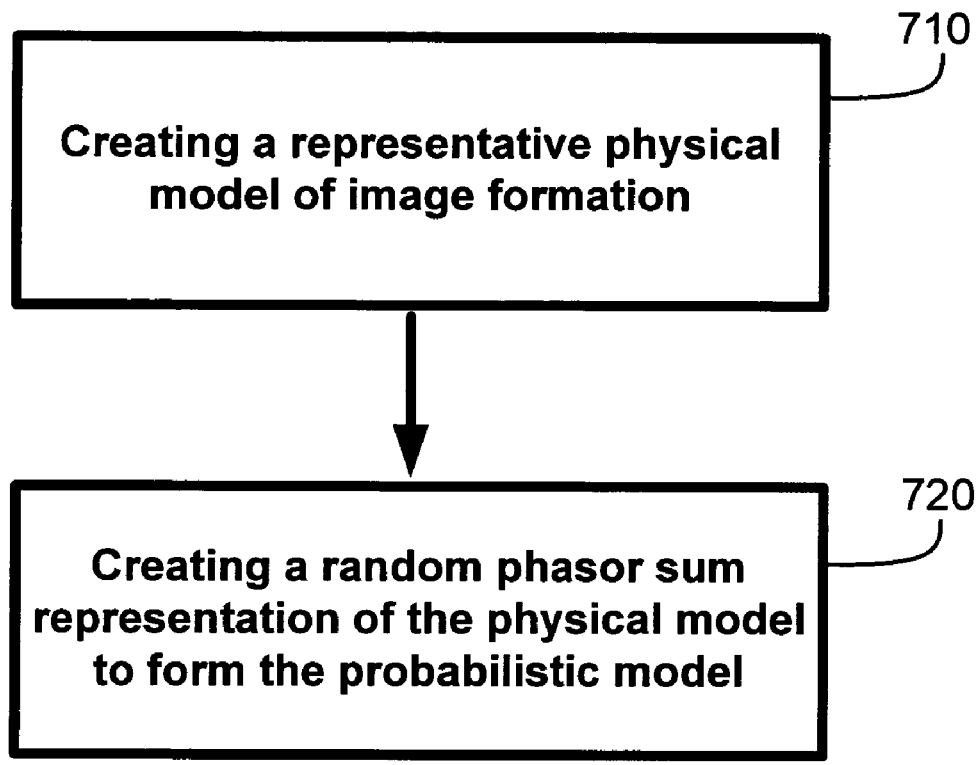
FIG. 7 illustrates a flow diagram showing structure of a program capable of being stored on computer readable medium and directed to forming a physically-based, probabilistic model for ultrasonic images, in accordance with one embodiment of the present invention.

FIGS. 7-10 illustrate flow diagrams outlining various method steps, and showing structure of programs capable of being stored on computer readable media, to create physically-based, probabilistic models for ultrasonic images in accordance with certain embodiments of the present invention. FIG. 7 illustrates forming a probabilistic model by creating a representative physical model of image formation 710, and creating a random phasor sum representation of the physical model to form the probabilistic model 720.

Figure 8:
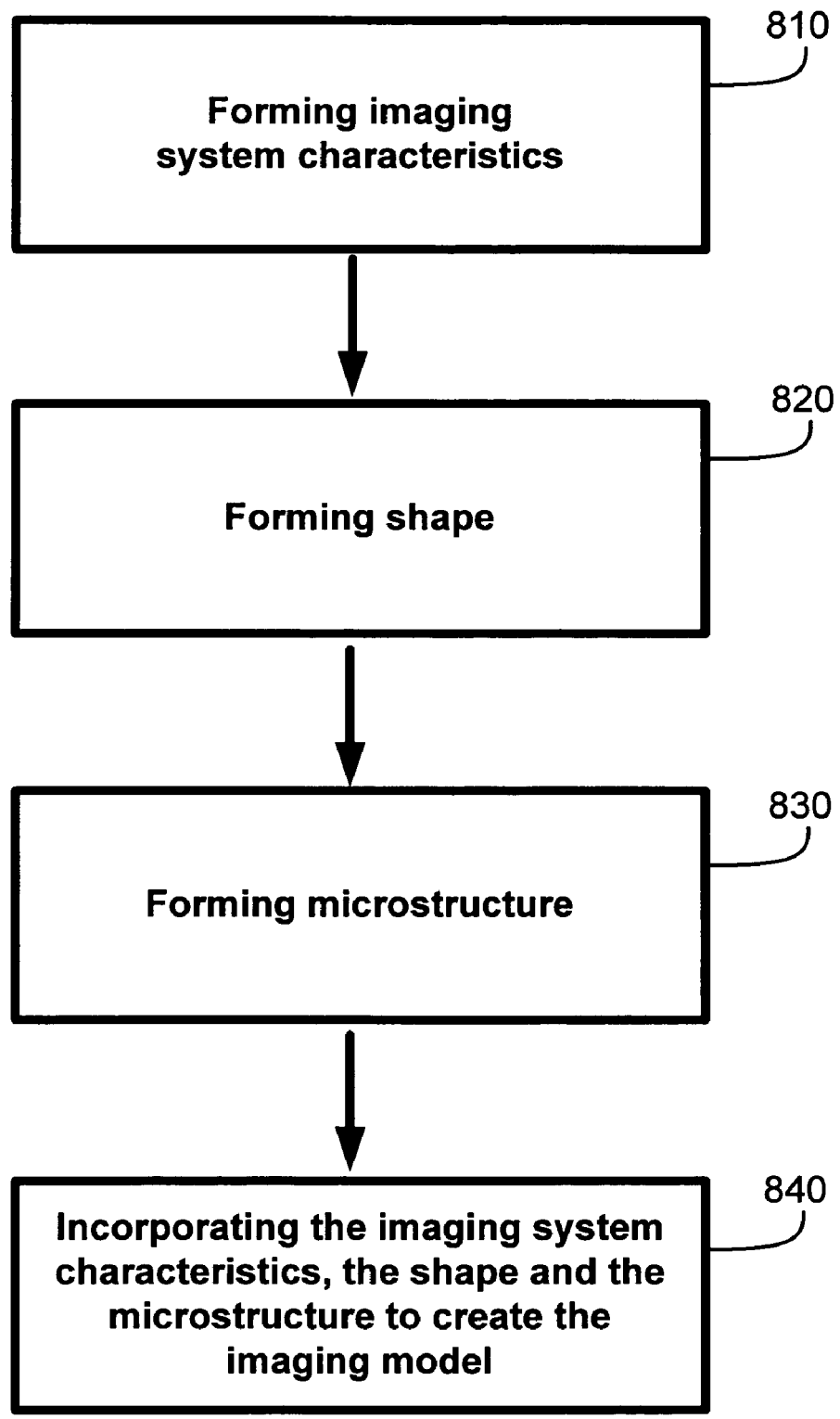
FIG. 8 illustrates a flow diagram showing structure of a program capable of being stored on computer readable medium and directed to forming an imaging model, in accordance with one embodiment of the present invention.

FIG. 8 illustrates steps for creating a representative physical model of image formation, including forming imaging system characteristics 810, forming shape 820, forming microstructure 830, and then incorporating the imaging system characteristics, the shape and the microstructure to create the imaging model 840.

Figure 9:
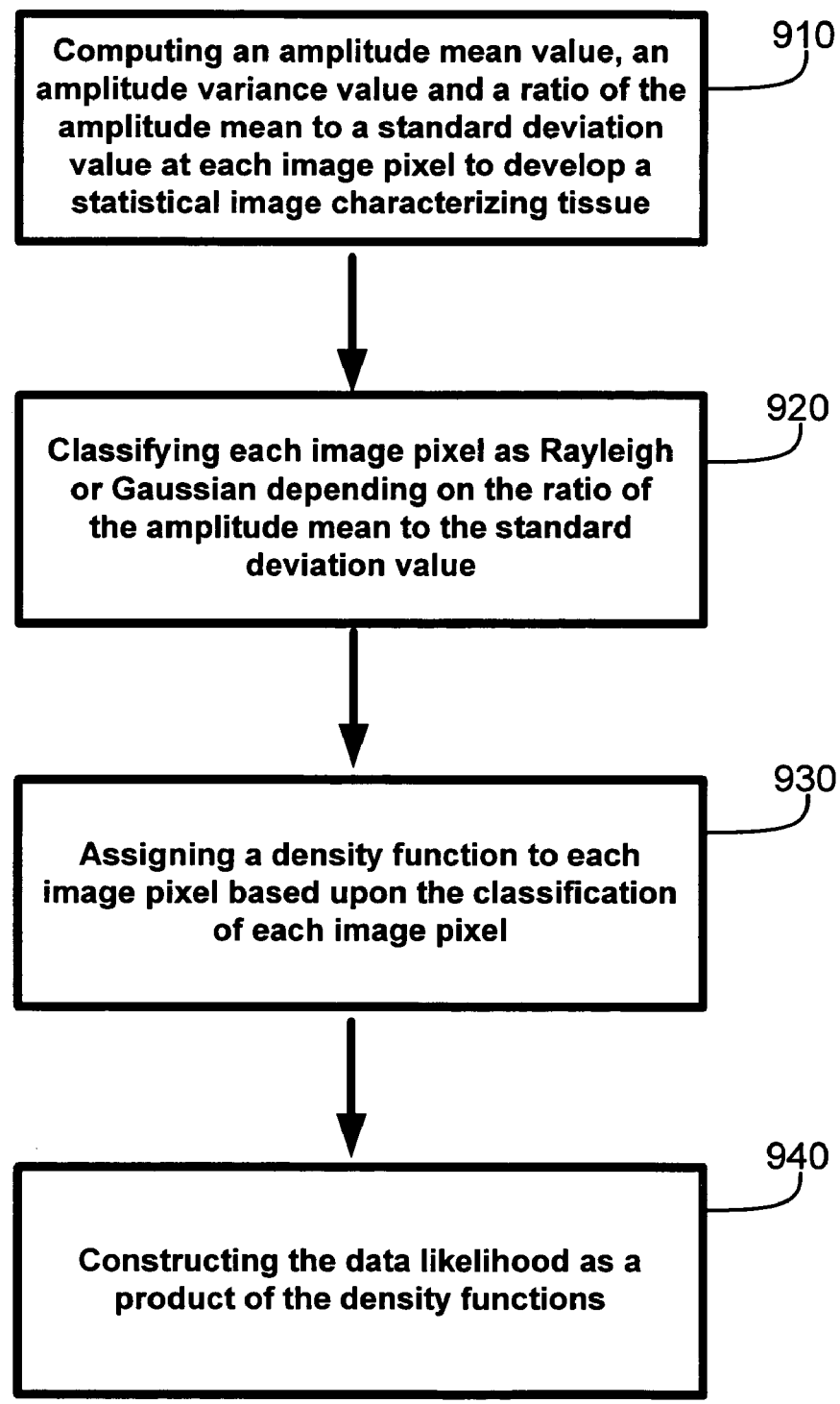
FIG. 9 illustrates a flow diagram showing structure of a program capable of being stored on computer readable medium and directed to creating image pixel based statistics, in accordance with one embodiment of the present invention.

FIG. 9 illustrates one embodiment for forming microstructure using image pixel-based statistics. The steps include computing an amplitude mean value, an amplitude variance value and a ratio of the amplitude mean to a standard deviation value at each image pixel to develop a statistical image characterizing tissue 910; classifying each image pixel as Rayleigh or Gaussian depending on the ratio of the amplitude mean to the standard deviation value 920; assigning a density function to each image pixel based upon the classification of each image pixel 930; and constructing the data likelihood as a product of the density functions.

Figure 10:
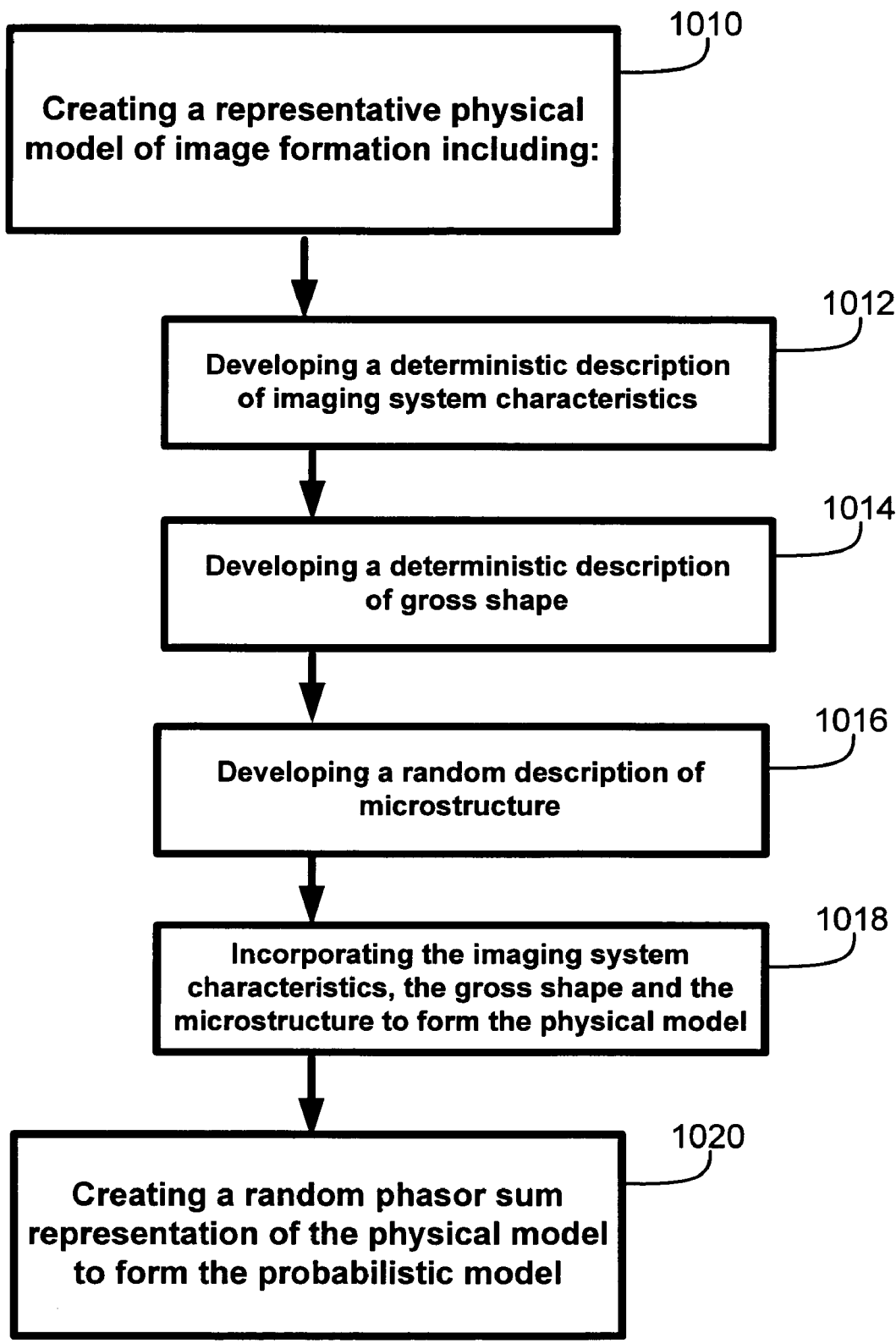
FIG. 10 illustrates a flow diagram showing structure of a program capable of being stored on computer readable medium and directed to forming a physically-based, probabilistic model for ultrasonic images, in accordance with one embodiment of the present invention.

FIG. 10 illustrates another embodiment for forming a physically-based, probabilistic model for ultrasonic images by creating a representative physical model of image formation 1010 and creating a random phasor sum representation of the physical model to form the probabilistic model 1020. In this embodiment, the physical model of image formation is created by developing a deterministic description of imaging system characteristics 1212, developing a deterministic description of gross shape 1014, developing a random description of microstructure 1016, and incorporating the imaging system characteristics, the gross shape and the microstructure to form the model 1018.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed is:

1. A method for forming an image model, comprising the steps of:
   developing imaging system characteristics;
   developing gross shape;
   developing microstructure; and
   incorporating the imaging system characteristics, the gross shape and the microstructure to form the image model, wherein:
   the image model includes a data likelihood enabling a statistical inference to formulate underlying characteristics;

the data likelihood is developed using image pixel based statistics and comprises the steps of:
  a. computing an amplitude mean value, an amplitude variance value and a ratio of the amplitude mean value to a standard deviation value at each image pixel to develop a statistical image characterizing tissue;
  b. classifying each pixel as Rayleigh or Gaussian determined by the ratio of the amplitude mean value to the standard deviation value;
  c. assigning a density function to each image pixel based upon the classification of each image pixel; and
  d. constructing the data likelihood as a product of the density functions.

2. The method of claim 1, wherein constructing the data likelihood assumes an independence between each image pixel.

3. The method of claim 1, wherein the image model is physically-based and the order of the steps permits inclusion of the imaging system characteristics, the gross shape and the microstructure at each image pixel without violating the physical image model.

4. The method of claim 1, wherein computation of the amplitude mean and the amplitude variance value is non-trivial, requiring calculation of multiple integrals for each pixel.

5. The method of claim 1, wherein the density function describes an echo amplitude of a respective image pixel.

6. The method of claim 1, wherein the data likelihood is suitable for performing pose estimation.

7. A method for forming an image model, comprising the steps of:
  developing imaging system characteristics;
  developing gross shape;
  developing microstructure; and
  incorporating the imaging system characteristics, the gross shape and the microstructure to form the image model, wherein tissue is characterized by a reflectivity function that comprises a sum of scaled three-dimensional delta functions.

8. A method for forming an image model, comprising the steps of:
  creating a physical model of image formation; and
  creating a random phasor sum representation of the physical model to form the probabilistic model.

9. The method of claim 8, wherein creating the physical model of image formation comprises the steps of:
  forming imaging system characteristics;
  forming microstructure; and
  incorporating the imaging system characteristics and the microstructure to create the physical model.

10. A method for forming an image model, comprising the steps of:
  creating a physical model of image formation; and
  creating a representation of the physical model to form the probabilistic model, wherein the representation is a data likelihood created from a random phasor sum representation of the physical model.

11. The method of claim 10, wherein the data likelihood enables a statistical inference to formulate underlying characteristics.

12. The method of claim 10, wherein the data likelihood is constructed using image pixel statistics by assigning a density function to each image pixel and constructing the data likelihood as a product of the density functions.

13. The method of claim 12, wherein constructing the data likelihood further comprises:
  computing an amplitude mean value, an amplitude variance value and a ratio of the amplitude mean value to a standard deviation value at each image pixel to develop a statistical image characterizing tissue;
  classifying each pixel as Rayleigh or Gaussian determined by the ratio of the amplitude mean value to the standard deviation value;
  assigning the density function to each image pixel based upon the classification of each image pixel.

14. A method for forming a physically-based, probabilistic model for ultrasonic images, comprising the steps of:
  creating a physical model of image formation; and
  creating a representation of the physical model to form the probabilistic model, wherein the representation is a random phasor sum representation resulting from a linear model of a radio frequency image portion of the physical model, the radio frequency image portion being characterized by a point spread function.

15. The method of claim 14, wherein tissue is characterized in the radio frequency image portion by a reflectivity function.

16. The method of claim 15, wherein tissue is characterized in the radio frequency image portion by a discrete scatterer model.

17. The method of claim 16, wherein the discrete scatterer model includes multiple discrete scatterers distributed across a surface of the gross shape.

18. The method of claim 17, wherein spatial location of the discrete scatterers distributed across the surface is parametrized by a scatterer concentration and a surface roughness.

19. The method of claim 17, wherein each discrete scatterer is a sub-wavelength perturbation in the surface that scatters strongly in the direction of a transducer.

20. The method of claim 17, wherein each discrete scatterer contributes a phasor to the random phasor sum representation of the physical model.

21. A method for forming a physically-based, probabilistic model for ultrasonic images, comprising the steps of:
  creating a representative physical model of image formation wherein creating the physical model includes:
    forming imaging system characteristics;
    forming shape; and
    forming microstructure using image pixel-based statistics comprising the steps of:
      a. computing an amplitude mean value, an amplitude variance value and a ratio of the amplitude mean to a standard deviation value at each image pixel to develop a statistical image characterizing tissue;
      b. classifying each image pixel as Rayleigh or Gaussian depending on the ratio of the amplitude mean to the standard deviation value;
      c. assigning a density function to each image pixel based upon the classification of each image pixel; and
      d. constructing the data likelihood as a product of the density functions; and
    incorporating the imaging system characteristics, the shape and the microstructure to create the physical model; and
  creating a representation of the physical model to form the probabilistic model.

22. A method for forming a physically-based, probabilistic model for ultrasonic images, comprising the steps of:

a. creating a representative physical model of image formation, including:
   i. formulating a deterministic description of imaging system characteristics,
   ii. formulating a deterministic description of gross shape,
   iii. formulating a random description of microstructure, and
   iv. incorporating the imaging system characteristics, the gross shape and the microstructure to form the model; and
b. creating a random phasor sum representation of the physical model to form the probabilistic model.

23. A computer readable medium that configures a computer to perform a method that forms a physically-based, probabilistic model for ultrasonic images, the method comprising the steps of:

creating a representative physical model of image formation; and creating a representation of the physical model to form the probabilistic model, wherein the representation is a random phasor sum representation resulting from a linear model of a radio frequency image portion of the physical model, the radio frequency image portion being characterized by a point spread function.

24. The computer readable medium of claim 23, wherein tissue is characterized in the radio frequency image portion by a reflectivity function.

25. The computer readable medium of claim 24, wherein tissue is characterized in the radio frequency image portion by a discrete scatterer model.

26. The computer readable medium of claim 25, wherein the discrete scatterer model includes multiple discrete scatterers distributed across a surface of the gross shape.

27. The computer readable medium of claim 26, wherein spatial location of the discrete scatterers distributed across the surface is parametrized by a scatterer concentration and a surface roughness.

28. The computer readable medium of claim 26, wherein each discrete scatterer is a sub-wavelength perturbation in the surface that scatters strongly in the direction of a transducer.

29. The computer readable medium of claim 26, wherein each discrete scatterer contributes a phasor to the random phasor sum representation of the physical model.

30. A computer readable medium that configures a computer to perform a method that forms a physically-based, probabilistic model for ultrasonic images, the method comprising the steps of:

creating a representative physical model of image formation; and creating a representation of the physical model to form the probabilistic model, wherein the probabilistic model is formed using image pixel-based statistics comprising the steps of:
   a. computing an amplitude mean value, an amplitude variance value and a ratio of the amplitude mean to a standard deviation value at each image pixel to develop a statistical image characterizing tissue;
   b. classifying each image pixel as Rayleigh or Gaussian depending on the ratio of the amplitude mean to the standard deviation value;
   c. assigning a density function to each image pixel based upon the classification of each image pixel; and
   d. constructing a data likelihood as a product of the density functions.

31. A computer readable medium that configures a computer to perform a method that forms a physically-based, probabilistic model for ultrasonic images, the method comprising the steps of:

a. creating a representative physical model of image formation, including:
   i. formulating a deterministic description of imaging system characteristics,
   ii. formulating a deterministic description of gross shape,
   iii. formulating a random description of microstructure, and
   iv. incorporating the imaging system characteristics, the gross shape and the microstructure to form the model; and
b. creating a random phasor sum representation of the physical model to form the probabilistic model.

32. A computer readable medium that stores a program to form a physically-based, probabilistic model for ultrasonic images, the program comprising:
   a. means for creating a representative physical model of image formation; and
   b. means for creating a random phasor sum representation of the physical model to form the probabilistic model, wherein the representation is a data likelihood created from the random phasor sum representation of the physical model.

33. A computer readable medium that stores a program to perform image pixel based statistics, the program comprising:
   a. means for computing an amplitude mean value, an amplitude variance value and a ratio of the amplitude mean to a standard deviation value at each image pixel to develop a statistical image characterizing tissue;
   b. means for classifying each image pixel as Rayleigh or Gaussian depending on the ratio of the amplitude mean to the standard deviation value;
   c. means for assigning a density function to each image pixel based upon the classification of each image pixel; and
   d. means for constructing the data likelihood as a product of the density functions.

34. A computer readable medium that stores a program to form a physically-based, probabilistic model for ultrasonic images, the program comprising:
   a. means for creating a representative physical model of image formation, including:
      i. means for developing a deterministic description of imaging system characteristics,
      ii. means for developing a deterministic description of gross shape,
      iii. means for developing a random description of microstructure, and
      iv. means for incorporating the imaging system characteristics, the gross shape and the microstructure to form the physical model; and
   b. means for creating a random phasor sum representation of the physical model to form the probabilistic model.

* * * * *